United States Patent [19]

Dirksing

[11] Patent Number: 5,355,544

[45] Date of Patent: Oct. 18, 1994

[54] FORCE-INDICATING TOOTHBRUSH USING MAGNETIC LATCHING

[75] Inventor: Robert S. Dirksing, Cincinnati, Ohio

[73] Assignee: The Procter & Gamble Company, Cincinnati, Ohio

[21] Appl. No.: 216,598

[22] Filed: Mar. 22, 1994

Related U.S. Application Data

[63] Continuation of Ser. No. 157,357, Nov. 22, 1993, abandoned.

[51] Int. Cl.⁵ .............................................. A46B 9/04
[52] U.S. Cl. .................................... 15/105; 15/167.1; 434/263
[58] Field of Search .................. 15/22.1, 105, 143.1, 15/167.1, 167.2, 201; 434/263

[56] References Cited

U.S. PATENT DOCUMENTS

| | | | |
|---|---|---|---|
| 2,697,642 | 12/1954 | Rudy | 15/143.1 |
| 2,798,241 | 7/1957 | Cohen | 15/143.1 |
| 3,493,991 | 2/1970 | De Bianchi | 15/143.1 |
| 4,253,212 | 3/1981 | Fujita | 15/167.1 |
| 4,340,069 | 7/1982 | Yeaple | 128/776 |
| 4,476,604 | 10/1984 | White et al. | 15/167.1 |
| 4,520,526 | 6/1985 | Peters | 15/167.1 |
| 4,680,825 | 7/1987 | White et al. | 15/167.1 |
| 4,680,826 | 7/1987 | Schunter | 15/147.1 |
| 4,698,869 | 10/1987 | Mierau et al. | 15/167.1 |
| 4,716,614 | 1/1988 | Jones et al. | 15/167.1 |
| 5,105,499 | 4/1992 | Dirksing | 15/167.1 |
| 5,134,743 | 8/1992 | Hukuba | 15/105 |
| 5,137,447 | 8/1992 | Hunter | 433/72 |
| 5,146,645 | 9/1992 | Dirksing | 15/167.1 |

FOREIGN PATENT DOCUMENTS

| | | | |
|---|---|---|---|
| 0481553A1 | 4/1992 | European Pat. Off. | |
| 3716490 | 11/1988 | Fed. Rep. of Germany | 15/105 |
| 2471757 | 6/1981 | France | 15/167.1 |
| 101490 | 4/1990 | Japan | 434/263 |

*Primary Examiner*—Mark Spisich
*Attorney, Agent, or Firm*—Ronald W. Kock; Kevin C. Johnson; Michael E. Hilton

[57] ABSTRACT

A force indicating toothbrush which uses magnetic latching to hold a movable brush member against a hollow handle. When held by the hollow handle, the bristles of the brush member are pressed against the user's teeth and gums until a predetermined force is reached. The predetermined force causes unlatching of the magnetic latch and movement of the brush member relative to the hollow handle, thereby indicative the user that too much pressure has been exerted against the teeth and gums.

18 Claims, 2 Drawing Sheets

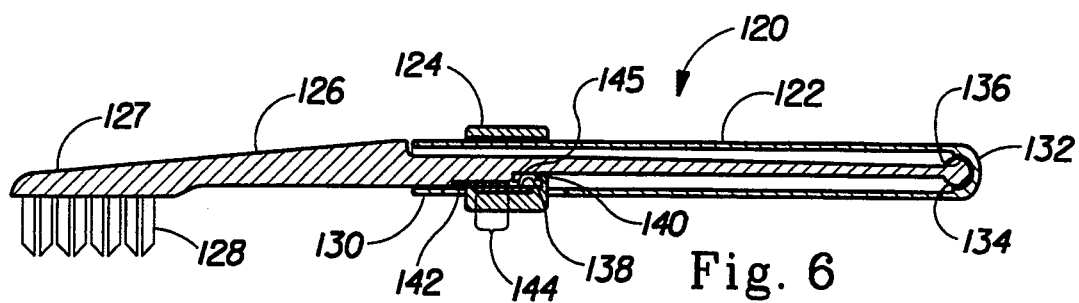
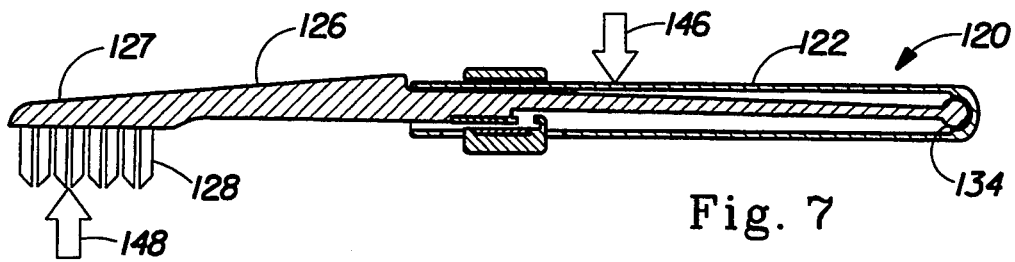
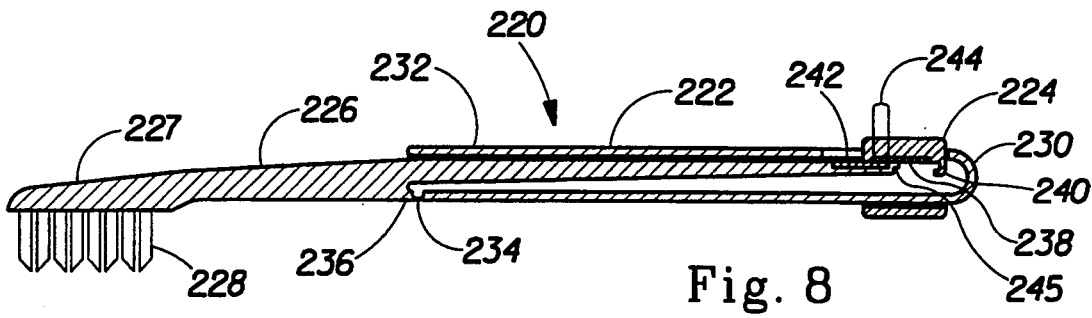
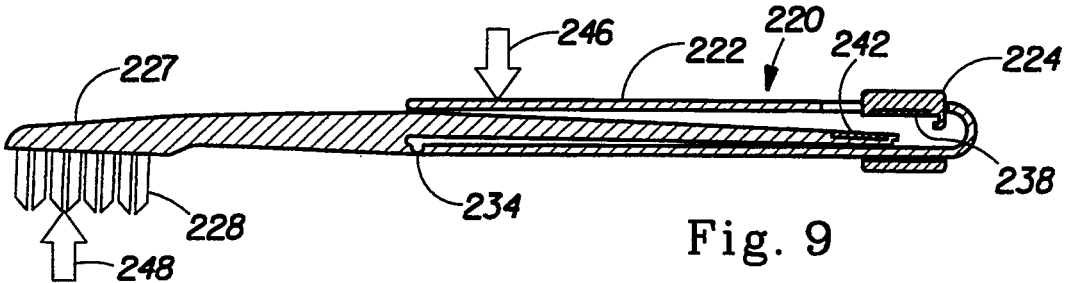
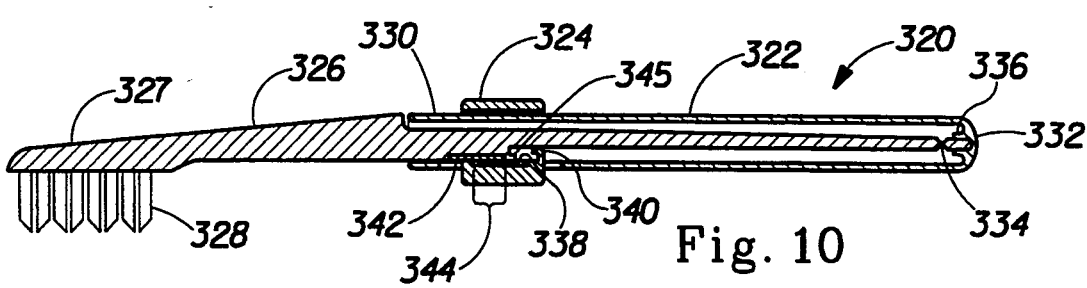
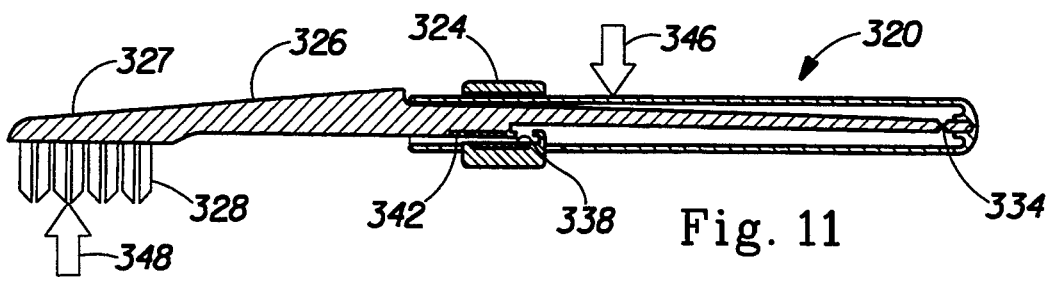

FORCE-INDICATING TOOTHBRUSH USING MAGNETIC LATCHING

This is a continuation of application Ser. No. 08/157,357, filed on Nov. 22, 1993, now abandoned.

FIELD OF THE INVENTION

The present invention relates to force-indicating toothbrushes, and more particularly to such force-indicating toothbrushes wherein magnetic latching is used to indicate when a predetermined force has been applied to the brush bristles. Even more particularly, the present invention relates to magnetic latching for force-indicating toothbrushes wherein the attractive force of the magnetic latching is manually adjustable.

BACKGROUND OF THE INVENTION

It has been recognized for some time that vigorous brushing of the teeth with excessive force can cause damage to tooth material and to gum tissue. Consequently there have been attempts in the prior art to produce toothbrushes that yield in response to excessive manual force on the handle. For example, some prior art toothbrushes have a flexible neck located between the brush end and the handle end. The flexible neck bends in response to increased force applied on the handle, thereby distorting the brush shape. For effective cleaning of the teeth, some amount of pressure needs to be applied to the brush bristles from the handle. With flexible neck toothbrushes the flexible neck acts as a spring, transmitting whatever force is applied at the handle, but offering no clear indication of what is considered to be an excessive force. Furthermore, bending of the toothbrush makes it annoying to use, and the accompanying loss of toothbrush control can itself result in tissue damage.

Attempts to overcome the problems of flexible neck toothbrushes include toothbrushes having complex battery operated light systems signalling excessive handle force, and toothbrush handles which buckle when a predetermined force is reached. Such toothbrushes have their own problems. Battery operated systems result in excessive toothbrush cost. Buckling of plastic toothbrush handles may result in material fatigue where the predetermined force gradually changes over the life of the brush or the buckling member fails. Alternatively, expensive toothbrush materials and construction often result when attempting to minimize such performance limitations.

The level of "excessive" brushing force may vary from one individual to the next, depending on age and condition of the gums at the time. Those prior art toothbrushes, which actually indicate an excessive force, generally indicate only one predetermined force. Also, they are designed to flex or buckle whenever they undergo force application. That is, the force-indicating feature cannot be locked out for greater toothbrush rigidity for traveling, for example, to avoid damage to delicate toothbrush parts.

An object of the present invention is to provide a force-indicating toothbrush which is user adjustable within a range of reasonable brush force levels, such that once a predetermined force is selected, it is repeatable over the life of the brush.

Another object of the present invention is to provide a means for locking out the force-indicating feature when desirable.

A further object of the present invention is to provide a force-indicating toothbrush which can be made inexpensively from common materials and which provides both a tactile and an audible indicator of excessive force.

Yet another object of the present invention is to provide a force-indicating toothbrush which can have its brush member and handle molded as one piece.

SUMMARY OF THE INVENTION

In one preferred embodiment of the present invention a force-indicating toothbrush comprises a hollow handle having a latching end and a connecting end and a brush member having a brush head, a connecting point, and a magnetic surface. The brush member is arranged relative to the hollow handle such that the connecting end of the hollow handle connects to the connecting point of the brush member. The brush member may move relative to the hollow handle to enable the latching end of the hollow handle to be adjacent to the magnetic surface of the brush member. A magnet is connected to the latching end of the hollow handle opposite the magnetic surface of the brush member. When the magnet contacts the magnetic surface over a contact area, a magnetic force latches the brush member to the hollow handle until a predetermined force is applied to the brush head to cause the magnet to separate from the magnetic surface. When the magnet separates from the magnetic surface, the brush member is unlatched from the hollow handle, thereby indicating that the predetermined force has been exceeded.

There are several options for this embodiment. The connecting point between the hollow handle and the brush member may be located between the brush head and the magnetic surface. The magnetic surface may be located between the brush head and the connecting point. The connection point may comprise a friction joint which enables the brush member to pivot relative to the hollow handle. The connection point may comprise a resilient portion of the hollow handle or brush member, enabling the brush member to bend relative to the hollow handle. In addition, the magnetic surface may also be a magnet.

This embodiment further comprises an adjustable portion of the hollow handle at its latching end where the magnet is connected. The adjustable portion is movable such that the contact area between the magnetic surface and the magnet may be varied in order to change the magnetic force. Also there is a secondary means for engaging the brush member to the hollow handle such that the brush member cannot move relative to the hollow handle without manually disengaging the secondary means. The secondary means for engaging the brush member preferably comprises an L-shaped member extending from the adjustable portion of the hollow handle. The L-shaped member is adapted to interlock with the brush member when the adjustable portion is moved to where the contact area between the magnet and the magnetic surface is maximized.

In a second preferred embodiment of the present invention a force-indicating toothbrush comprises a hollow handle having a latching end and a connecting end and a brush member having brush head, a connecting point, and a magnet attached thereto. The brush member is arranged relative to the hollow handle such that the connecting end of the hollow handle connects to the connecting point of the brush member. The brush member moves relative to the hollow handle to enable the latching end of the hollow handle to be adjacent to the magnet on the brush member. A magnetic surface is on the latching end of the hollow handle opposite the magnet on the brush member. When the magnet contacts the magnetic surface over a contact area, a magnetic force latches the brush member to the hollow handle until a predetermined force is applied to the brush head to cause the magnet to separate from the magnetic surface, thereby unlatching the brush member from the hollow handle to indicate that the predetermined force has been exceeded.

The only difference between the first embodiment and the second embodiment is that the magnet and magnetic surfaces are switched between the hollow handle and brush member. The options and additions applied to the first embodiment also apply to the second embodiment.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

FIG. 6 is a sectioned side elevational view of a second preferred embodiment of the force-indicating toothbrush of the present invention, similar to FIG. 2, showing a brush member connected to one end of a hollow handle and magnetically latched to the hollow handle;

FIG. 7 is a sectioned side elevational view of the embodiment of FIG. 6, showing the forces normally applied to the toothbrush during use, and showing the brush member and hollow handle in an unlatched condition;

FIG. 8 is a sectioned side elevational view of a third preferred embodiment of the force-indicating toothbrush of the present invention, similar to FIG. 2, showing the brush member connected to the hollow handle near the center of the brush member and magnetically latched to the hollow handle;

FIG. 9 is a sectioned side elevational view of the embodiment of FIG. 8, showing the forces normally applied to the toothbrush during use, and showing the brush member and hollow handle in an unlatched condition;

FIG. 10 is a sectioned side elevational view of a fourth preferred embodiment of the force-indicating toothbrush of the present invention, similar to FIG. 2, showing a brush member connected to one end of a hollow handle and magnetically latched to the hollow handle; and FIG. 11 is a sectioned side elevational view of the embodiment of FIG. 10, showing the forces normally applied to the toothbrush during use, and showing the brush member and hollow handle in an unlatched condition.

DETAILED DESCRIPTION OF THE INVENTION

Figure 1:
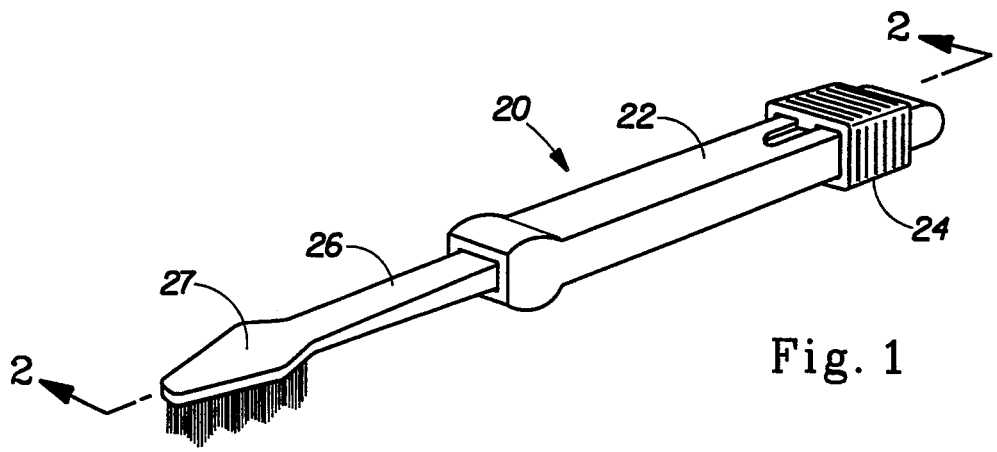
FIG. 1 is a perspective view of a first preferred embodiment of a force-indicating toothbrush of the present invention, disclosing a brush member, a hollow handle, and an adjustable portion of the hollow handle.

Referring now to the drawings, and particularly to FIGS. 1 through 5, there is shown a first preferred embodiment of a force-indicating toothbrush of the present invention, generally indicated as 20. Force-indicating toothbrush 20 comprises a hollow handle 22 having an adjustable portion 24 movably attached to hollow handle 22, and a brush member 26 having a brush head 27 attached at one end. Attached to brush head 27 are bristles 28.

Figure 2:
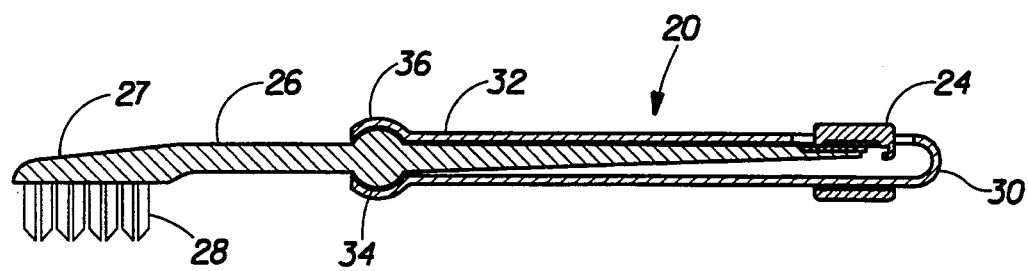
FIG. 2 is a sectioned side elevational view thereof, taken along section line 2—2 of FIG. 1, showing the brush member connected to the hollow handle near the center of the brush member and magnetically latched to the hollow handle.

FIG. 2 is a cross-sectional view of force-indicating toothbrush 20 of FIG. 1, showing hollow handle 22 further comprising a latching end 30 and a connecting end 32. Brush member 26 is shown attached to the connecting end 32 of hollow handle 22 by means of a friction joint 34 at connecting point 36. Friction joint 34 enables brush member 26 to pivot relative to hollow handle 22.

Figure 3:
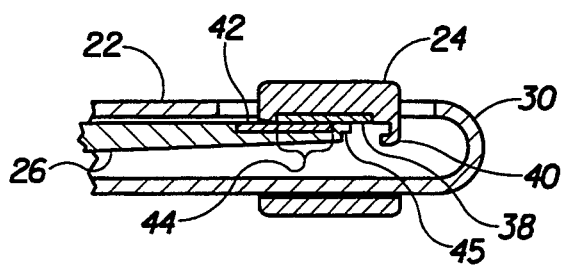
FIG. 3 is an enlarged sectioned side elevational view of the latching end of the hollow handle of FIG. 2, showing the brush member magnetically latched to the hollow handle.
Figure 4:
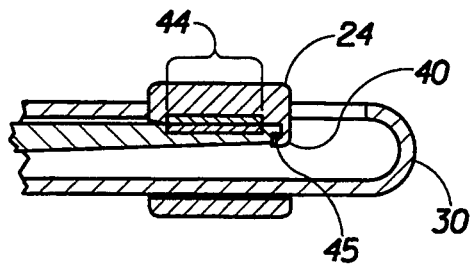
FIG. 4 is an enlarged sectioned side elevational view similar to FIG. 3, but showing the adjustable portion of the hollow handle moved to a position where mechanical interlocking occurs between the brush member and hollow handle.

FIGS. 3 and 4 are enlarged sectioned views of FIG. 2 showing the latching end 30 of hollow handle 22. Adjustable portion 24 is shown further comprising magnet 38 and "L" shaped member 40. Brush member 26 is shown further comprising magnetic surface 42. Magnetic attraction latches magnetic surface 42 to magnet 38 along a contact area 44 between them. Magnetic surface 42 may be a magnetically attracted material, such as soft iron, or another magnet. Greater or lesser surface area engagement of magnet 38 and magnetic surface 42, and thus greater or lesser latching force, may be accomplished by manually moving adjustable portion 24 along hollow handle 22 in order to vary contact area 44.

In addition to magnetic latching, secondary means for engaging brush member 26 to hollow handle 22, such as mechanical interlocking, may also be provided. In FIG. 4, adjustable portion 24 is shown positioned such that "L" shaped member 40 of adjustable portion 24 engages a mating portion 45 on the end of brush member 26, such that brush member 26 may be interlocked to adjustable portion 24. In this position contact area 44 is also at a maximum.

Figure 5:
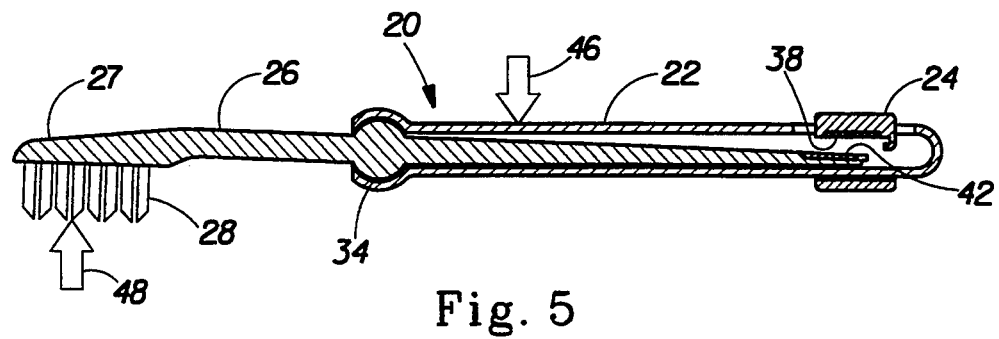
FIG. 5 is a sectioned side elevational view of the embodiment of FIG. 1, taken along section line 2—2 of FIG. 1, showing the forces normally applied to the toothbrush during use, and showing the brush member and hollow handle in an unlatched condition.

In FIG. 5, a force, indicated by arrow 46, is applied to hollow handle 22, which represents a typical position for a manual force to be applied to hollow handle 22 during use. During use, an opposing force is applied to bristles 28, from contact with teeth and gums, which is indicated by arrow 48. Opposing forces 46 and 48 tend to pivot brush member 26 about friction joint 34 relative to hollow handle 22. The movement of brush member 26 about friction joint 34 pulls magnetic surface 42 away from magnet 38. If force 46 applied to hollow handle 22 produces an opposing force 48 at brush head 28 which exceeds a predetermined level, the attraction between magnet 38 and magnetic surface 42 will be overcome, thereby unlatching magnetic surface 42 from magnet 38. The release of magnetic surface 42 from magnet 38 is so abrupt that the brush member is rapidly pushed to the opposite side of the hollow handle from magnet 38. As brush member 26 contacts the opposite side of the hollow handle, a distinct tactile and/or audible signal is provided to the user to indicate that the desired maximum brushing force has been exceeded.

When the toothbrush 20 is released from contact with an opposing surface, the magnetic attraction across the gap between the unlatched magnet 38 and magnetic surface 42 will ideally cause the force-indicating toothbrush 20 to reset. That is, magnet 38 will again latch against magnetic surface 42. However, depending on the gap between the magnet and magnetic surface when unlatched, and the friction at friction joint 34, the user may be required to assist in resetting the toothbrush by pivoting brush member 26 relative to hollow handle 22 until relatching occurs.

A recommended bristle force range of 150 grams to 300 grams may be accomodated by selecting the appropriate magnet 38 and magnetic surface 42 to provide sufficient magnetic flux; by selecting the appropriate length ratio between pivot-to-brush head and pivot-to-contact area to provide sufficient leverage; and by sizing the magnetic contact area to provide sufficient magnetic latching force. The magnetic latching force may then be varied manually by moving the adjustable portion 24 through a distance sufficient to change the contact area 44 such that the recommended bristle force range is encompassed. Once adjustable portion 24 is adjusted, the magnetic latching force is essentially fixed. Thus, a predetermined bristle force is established, which if exceeded, will cause unlatching of the magnet and magnetic surface.

In FIG. 3, adjustable portion 24 is shown positioned such that brush member 26 is magnetically latched to hollow handle 22. However, in FIG. 4 the adjustable portion 24 is shown moved to the position in which the "L" shaped member 40 mechanically interlocks with a mating portion 45 on the end of brush member 26. In this position mechanical interlocking restricts movement of brush member 26 relative to hollow handle 22 regardless of the bristle force applied, thereby disabling the force-indicating system. Disabling the force indicating system may be desirable when greater brushing force is needed, such as for cleaning the faces of the molars.

Referring to FIGS. 6 and 7, there is shown a second preferred embodiment of a force-indicating toothbrush of the present invention, generally indicated as 120. Force indicating toothbrush 120 comprises a hollow handle 122 having an adjustable portion 124 movably attached to hollow handle 122, and a brush member 126 having a brush head 127 at one end. Attached to brush head 127 are bristles 128. Hollow handle 122 further comprises latching end 130 and connecting end 132. Brush member 126 is shown attached to the connecting end 132 of hollow handle 122 by means of a friction joint 134 at connecting point 136. Friction joint 134 enables brush member 126 to pivot relative to hollow handle 122. Adjustable portion 124 includes magnet 138 and "L" shaped member 140. Brush member 126 is shown further comprising magnetic surface 142. Magnetic attraction latches magnetic surface 142 to magnet 138 at a contact area 144 between them. Magnetic surface 142 may be a magnetically attracted material, such as soft iron, or another magnet. Greater or lesser engagement of magnet 138 and magnetic surface 142, and thus greater or lesser latching force, may be accomplished by manually moving adjustable portion 124 along hollow handle 122 to vary contact area 144. Disabling the force-indicating feature of toothbrush 120 may be accomplished by moving adjustable portion 124 so that "L" shaped member 140 engages a mating portion 145 of brush member 126 adjacent to contact area 144, thereby preventing pivoting of brush member 126 relative to hollow handle 122.

In FIG. 7, a force, indicated by arrow 146, is applied to hollow handle 122, which represents a typical position for a manual force to be applied to hollow handle 122 during use. During use, an opposing force is applied to bristles 128, from contact with teeth and gums, which is indicated by arrow 148. Opposing forces 146 and 148 tend to pivot brush member 126 about friction joint 134 relative to hollow handle 122. The pivoting of brush member 126 about friction joint 134 pulls magnetic surface 142 from magnet 138. If force 146 applied to hollow handle 122 produces an opposing force 148 at brush head 128 exceeding a predetermined level, the attraction between magnet 138 and magnetic surface 142 is overcome, thereby unlatching magnetic surface 142 from magnet 138. The release of magnetic surface 142 from magnet 138 is so abrupt that the brush member is rapidly pushed to the opposite side of the hollow handle from magnet 138. As brush member 126 contacts the opposite side of the hollow handle, a distinct tactile and/or audible signal is provided to the user to indicate that a desired maximum brushing force has been exceeded. The desired maximum brushing force may be varied about a range by moving the adjustable portion 124.

Referring to FIGS. 8 and 9, there is shown a third preferred embodiment of a force-indicating toothbrush of the present invention, generally indicated as 220. Force-indicating toothbrush 220 comprises a hollow handle 222 having an adjustable portion 224 which is movably attached to a hollow handle 222, and a brush member 226 having a brush head 227 at one end. Attached to brush head 227 are bristles 228. Hollow handle 222 further comprises latching end 230 and connecting end 232. Brush member 226 is attached to the connecting end 232 of hollow handle 222 at a connecting point 236, which constitutes a resilient portion 234 between brush member 226 and hollow handle 222. Resilient portion 234 enables brush member 226 to bend relative to hollow handle 222. Adjustable portion 224 includes magnet 238 and "L" shaped member 240. Brush member 226 is shown further comprising magnetic surface 242. Magnetic attraction latches magnetic surface 242 to magnet 238 at a contact area 244 between them. Magnetic surface 242 may be a magnetically attracted material, such as soft iron, or another magnet. Greater or lesser engagement of magnet 238 and magnetic surface 242, and thus greater or lesser latching force, may be accomplished by manually moving adjustable portion 224 along hollow handle 222 to vary contact area 244. Disabling the force-indicating feature of toothbrush 220 may be accomplished by moving adjustable portion 224 so that "L" shaped member 240 engages a mating portion 245 of brush member 226 adjacent to contact area 244, thereby preventing bending of brush member 226 relative to hollow handle 222.

In FIG. 9, a force, indicated by arrow 246, is applied to hollow handle 222, which represents a typical position for a manual force to be applied to hollow handle 222 during use. During use, an opposing force is applied to bristles 228, from contact with teeth and gums, which is indicated by arrow 248. Opposing forces 246 and 248 tend to bend brush member 226 about resilient portion 234 relative to hollow handle 222. The bending of brush member 226 about resilient portion 234 pulls magnetic surface 242 from magnet 238. If force 246 applied to hollow handle 222 produces an opposing force 248 at bristles 228 exceeding a predetermined level, the attraction between magnet 238 and magnetic surface 242 is overcome, thereby unlatching magnetic surface 242 from magnet 238. The release of magnetic surface 2,42 from magnet 238 is so abrupt that the brush member is rapidly pushed to the opposite side of the hollow handle from magnet 238. As brush member 226 contacts the opposite side of the hollow handle, a distinct tactile and/or audible signal is provided to the user to indicate that the desired maximum brushing force has been exceeded. The desired maximum brushing force before unlatching occurs may be varied about a range by moving the adjustable portion 224 to change contact area 244.

Referring to FIGS. 10 and 11, there is shown a fourth preferred embodiment of a force-indicating toothbrush of the present invention, generally indicated as 320. Force-indicating toothbrush 320 comprises a hollow handle 322 having an adjustable portion 324 which is movably attached to hollow handle 322, and a brush member 326 having brush head 327 at one end. Attached to brush head 327 are bristles 328. Hollow handle 322 further comprises a latching end 330 and a connecting end 332. Brush member 326 is shown fixedly attached to the connecting end 332 of hollow handle 322 at connecting point 336. Brush member 326 has a resilient portion 334 adjacent connecting point 336. Resilient portion 334 enables brush member 326 to bend relative to hollow handle 322. Adjustable portion 324 is shown further comprising magnet 338 and "L" shaped member 340. Brush member 326 is shown further comprising magnetic surface 342. Magnetic attraction latches magnetic surface 342 to magnet 338 at a contact area 344 between them. Magnetic surface 342 may be a magnetically attracted material, such as soft iron, or another magnet. Greater or lesser engagement of magnet 338 and magnetic surface 342, and thus greater or lesser latching force, may be accomplished by manually moving adjustable portion 324 along hollow handle 322 to vary contact area 344. Disabling the force-indicating feature of toothbrush 320 may be accomplished by moving adjustable portion 324 so that "L" shaped member 340 engages a mating portion 345 of brush member 326 adjacent to contact area 344, thereby preventing bending of brush member 326 relative to hollow handle 322.

In FIG. 11, a force, indicated by arrow 346, is applied to hollow handle 322, which represents a typical position for a manual force to be applied to hollow handle 322 during use. During use, an opposing force is applied to bristles 328, from contact with teeth and gums, which is indicated by arrow 348. Opposing forces 346 and 348 tend to bend brush member 326 about resilient portion 334 relative to hollow handle 322. The bending of brush member 326 about resilient portion 334 pulls magnetic surface 342 from magnet 338. If force 346 applied to hollow handle 322 produces an opposing force 348 at brush head 328 exceeding a predetermined level, the attraction between magnet 338 and magnetic surface 342 is overcome, thereby unlatching magnetic surface 342 from magnet 338. The release of magnetic surface 342 from magnet 338 is so abrupt that the brush member is rapidly pushed to the opposite side of the hollow handle from magnet 338. As brush member 326 contacts the opposite side of the hollow handle, a distinct tactile and/or audible signal is provided to the user to indicate that the desired maximum brushing force has been exceeded. The desired maximum brushing force before unlatching occurs may be varied about a range by moving the adjustable portion 324 to change contact area 344.

Although the resilient joint 334 is shown as part of the brush member, the connection point 336 could also be relocated such that the resilient joint is part of the hollow handle.

In all four embodiments the magnet has been shown attached to the hollow handle and the magnetic surface as part of the brush member. It is instead possible to have the magnet attached to the brush member and the magnetic surface as part of the hollow handle. Also, the magnetic surface in any of these embodiments may also be a magnet having polarity arranged to attract the other magnet. Although permanent magnets are preferred because of their compactness, other means of providing magnetic force, such as electromagnets, is within the scope of this invention.

In a particularly preferred embodiment of the first type, hollow handle 22 and brush member 26 are both injection molded of a polymeric material, such as polypropylene. The overall length of force-indicating toothbrush 20 is about 190 min. Hollow handle 22 is about 110 mm long and preferably has a tubular shape. Friction joint 34 is cylindrical in shape with the axis of the cylinder being substantially perpendicular to force 48 applied to brush head 27.

Adjustable portion 24 is also injection molded of polymeric material, such as high density polyethylene. Adjustable portion 24 is generally in the form of a sleeve around hollow handle 22. Magnet 38 is adhesively attached to adjustable portion 24 where it extends through a slot in hollow handle 22. Magnet 38 is a piece of 1.5 mm thick extruded flexible magnetic strip, which is available from Magnet Technology of Cincinnati, Ohio. Magnet 38 has an attractive force against ferrous metal of about 70 grams per square centimeter. This value increases to about 90 grams per square centimeter when the magnetic surface 42 is another strip of extruded flexible magnet instead of ferrous metal.

Magnet 38 is about 10 mm wide by about 20 mm long. Magnetic surface 42 is preferably a second strip of flexible magnet having the same dimensions as magnet 38. At the low end of the preferred bristle force range of 150 grams, the contact area between magnet 38 and magnetic surface 42 is one square centimeter. At the high end of the preferred bristle force range of 300 grams the contact area between magnet 38 and magnetic surface 42 is 2 square centimeters. The corresponding magnetic latching forces are 90 grams and 180 grams, respectively. The lever arm length ratio of pivot-to-brush head to pivot-to-contact area is 0.6 so that the resulting bristle force range causing unlatching is 150 to 300 grams.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A force-indicating toothbrush comprising:
   a) a hollow handle having a latching end and a connecting end;
   b) a brush member having a brush head, a connecting point, and a magnetic surface, said connecting point and magnetic surface being disposed at spaced locations on said brush member said brush member arranged relative to said hollow handle such that said connecting end of said hollow handle is connected to said connecting point of said brush member to enable said brush member to move relative to said hollow handle about said connecting end, and said latching end of said hollow handle is positioned adjacent to said magnetic surface of said brush member; and
   c) a magnet connected to said latching end of said hollow handle opposite said magnetic surface of said brush member such that when said magnet contacts said magnetic surface over a contact area, a magnetic force latches said brush member to said hollow handle until a predetermined force is applied to said brush head to cause said magnet to separate from said magnetic surface, thereby unlatching said brush member from said hollow handle to indicate that said predetermined force has been exceeded.

2. The force-indicating toothbrush of claim 1 wherein said connecting point is located between said brush head and said magnetic surface.

3. The force-indicating toothbrush of claim 1 wherein said magnetic surface is located between said brush head and said connecting point.

4. The force-indicating toothbrush of claim 1 wherein said connecting point comprises a friction joint enabling said brush member to pivot relative to said hollow handle.

5. The force-indicating toothbrush of claim 1 wherein said connecting point comprises a resilient portion of said hollow handle enabling said brush member to bend relative to said hollow handle.

6. The force-indicating toothbrush of claim 1 wherein said connecting point comprises a resilient portion of said brush member enabling said brush member to bend relative to said hollow handle.

7. The force-indicating toothbrush of claim 1 wherein said magnetic surface is also a magnet.

8. The force-indicating toothbrush of claim 1 further comprising an adjustable portion of said latching end of said hollow handle to which said magnet is connected, said adjustable portion being movable relative to said hollow handle such that said contact area between said magnetic surface and said magnet may be varied in order to change said magnetic force.

9. The force-indicating toothbrush of claim 1 further comprising a secondary means for engaging said brush member to said hollow handle such that said brush member cannot move relative to said hollow handle without manually disengaging said secondary means.

10. A force-indicating toothbrush comprising:
    a) a hollow handle having a latching end and a connecting end;
    b) a brush member having a brush head, a connecting point and a magnet attached thereto said connecting point and magnet being disposed at spaced locations on said brush member said brush member arranged relative to said hollow handle such that said connecting end of said hollow handle connects to said connecting point of said brush member to enable said brush member to move relative to said hollow handle about said connecting end, and said latching end of said hollow handle is positioned adjacent to said magnet on said brush member; and
    c) a magnetic surface on said latching end of said hollow handle opposite said magnet on said brush member such that when said magnet contacts said magnetic surface over a contact area, a magnetic force latches said brush member to said hollow handle until a predetermined force is applied to said brush head to cause said magnet to separate from said magnetic surface, thereby unlatching said brush member from said hollow handle to indicate that said predetermined force has been exceeded.

11. The force-indicating toothbrush of claim 10 wherein said connecting point is located between said brush head and said magnet.

12. The force-indicating toothbrush of claim 10 wherein said magnet is located between said brush head and said connecting point.

13. The force-indicating toothbrush of claim 10 wherein said connecting point comprises a friction joint enabling said brush member to pivot relative to said hollow handle.

14. The force-indicating toothbrush of claim 10 wherein said connecting point comprises a resilient portion of said hollow handle enabling said brush member to bend relative to said hollow handle.

15. The force-indicating toothbrush of claim 10 wherein said connecting point comprises a resilient portion of said brush member enabling said brush member to bend relative to said hollow handle.

16. The force-indicating toothbrush of claim 10 wherein said magnetic surface is also a magnet.

17. The force-indicating toothbrush of claim 10 further comprising an adjustable portion of said latching end of said hollow handle at said magnetic surface, said adjustable portion being movable relative to said hollow handle such that said contact area between said magnetic surface and said magnet may be varied in order to change said magnetic force.

18. The force-indicating toothbrush of claim 10 further comprising a secondary means for engaging said brush member to said hollow handle such that said brush member cannot move relative to said hollow handle without manually disengaging said secondary means.

* * * * *